(12) United States Patent　　(10) Patent No.: US 6,658,745 B1
Huang　　(45) Date of Patent: Dec. 9, 2003

(54) PNEUMATIC POWER CUTTING TOOL

(75) Inventor: Chung-Jen Huang, Tucheng (TW)

(73) Assignee: Mountain Pneumatic Tools Co., Ltd., Taipei Hsien (TW)

( * ) Notice: Subject to any disclaimer, the term of this patent is extended or adjusted under 35 U.S.C. 154(b) by 0 days.

(21) Appl. No.: 10/187,297

(22) Filed: Jul. 2, 2002

(51) Int. Cl.[7] .............................................. B27B 19/00
(52) U.S. Cl. ............................ 30/392; 30/394; 173/49
(58) Field of Search ................................ 173/122, 114, 173/394, 49, 205; 30/392

(56) References Cited

U.S. PATENT DOCUMENTS

| | | | | |
|---|---|---|---|---|
| 4,976,164 A | * | 12/1990 | Lentino | 74/50 |
| 5,079,844 A | * | 1/1992 | Palm | 30/392 |
| 5,212,887 A | * | 5/1993 | Farmerie | 30/393 |
| 5,301,562 A | * | 4/1994 | Seto | 74/44 |
| 6,212,781 B1 | * | 4/2001 | Marinkovich et al. | 30/394 |
| 6,370,781 B1 | * | 4/2002 | Sasaki | 30/392 |
| 6,508,151 B1 | * | 1/2003 | Neitzell | 83/34 |

* cited by examiner

*Primary Examiner*—Allan N. Shoap
*Assistant Examiner*—John Windmuller
(74) *Attorney, Agent, or Firm*—Troxell Law Office PLLC

(57) ABSTRACT

A pneumatic power cutting tool is constructed to include an eccentric shaft, the eccentric transmission shaft having a first eccentric shaft and a second eccentric shaft eccentrically forwardly extended from the first eccentric shaft and adapted for reciprocating a cutter blade to cut the workpiece, a sliding block coupled to the first eccentric shaft by coupling means and adapted for sliding in a longitudinal sliding way in reverse to the reciprocation of the cutter blade to balance the centrifugal force due to the reciprocating motion of the cutter blade with the second eccentric shaft and to reduce the production of vibration and noise.

2 Claims, 7 Drawing Sheets

PNEUMATIC POWER CUTTING TOOL

BACKGROUND AND SUMMARY OF THE INVENTION

The present invention relates to a power hand tool adapted for cutting the packing frame of a glass panel, for example, a windshield packing frame and, more particularly, to a pneumatic power cutting tool with double-eccentric transmission shaft, which produces less vibration and noise during its operation.

When replacing the windshield glass of a motor vehicle or the glass panel of a big window, a cutting tool is used to cut the packing frame, which is fastened to the periphery of the glass by silicon rubber. It takes much time and labor to cut the packing frame with a hand-operated cutting tool. However, when a pneumatic power cutting tool is used to cut the packing frame, high noise and severe vibration are produced during the reciprocating motion of the cutting blade of the pneumatic power cutting tool, and the motor becomes overheat after a certain length of time in operation. The severe vibration of the pneumatic power cutting tool may injure the operator's hands easily.

The present invention has been accomplished under the circumstances in view. It is the main object of the present invention to provide a pneumatic power cutting tool, which produces less vibration and noise during its operation. It is another object of the present invention to provide a pneumatic power cutting tool, which is convenient in use and practical for a long time operation without hurting the user's hands. It is still another object of the present invention to provide a pneumatic power cutting tool, which is durable in use. To achieve these and other objects of the present invention the pneumatic power cutting tool comprises an eccentric shaft, the eccentric transmission shaft having a first eccentric shaft and a second eccentric shaft eccentrically forwardly extended from the first eccentric shaft, and adapted for reciprocating a cutter blade to cut the workpiece, a sliding block coupled to the first eccentric shaft by coupling means and adapted for sliding in a longitudinal sliding way in reverse to the reciprocation of the cutter blade to balance the centrifugal force due to the reciprocating motion of the cutter blade with the second eccentric shaft and to reduce the production of vibration and noise.

DETAILED DESCRIPTION OF THE PREFERRED EMBODIMENT

Figure 1:
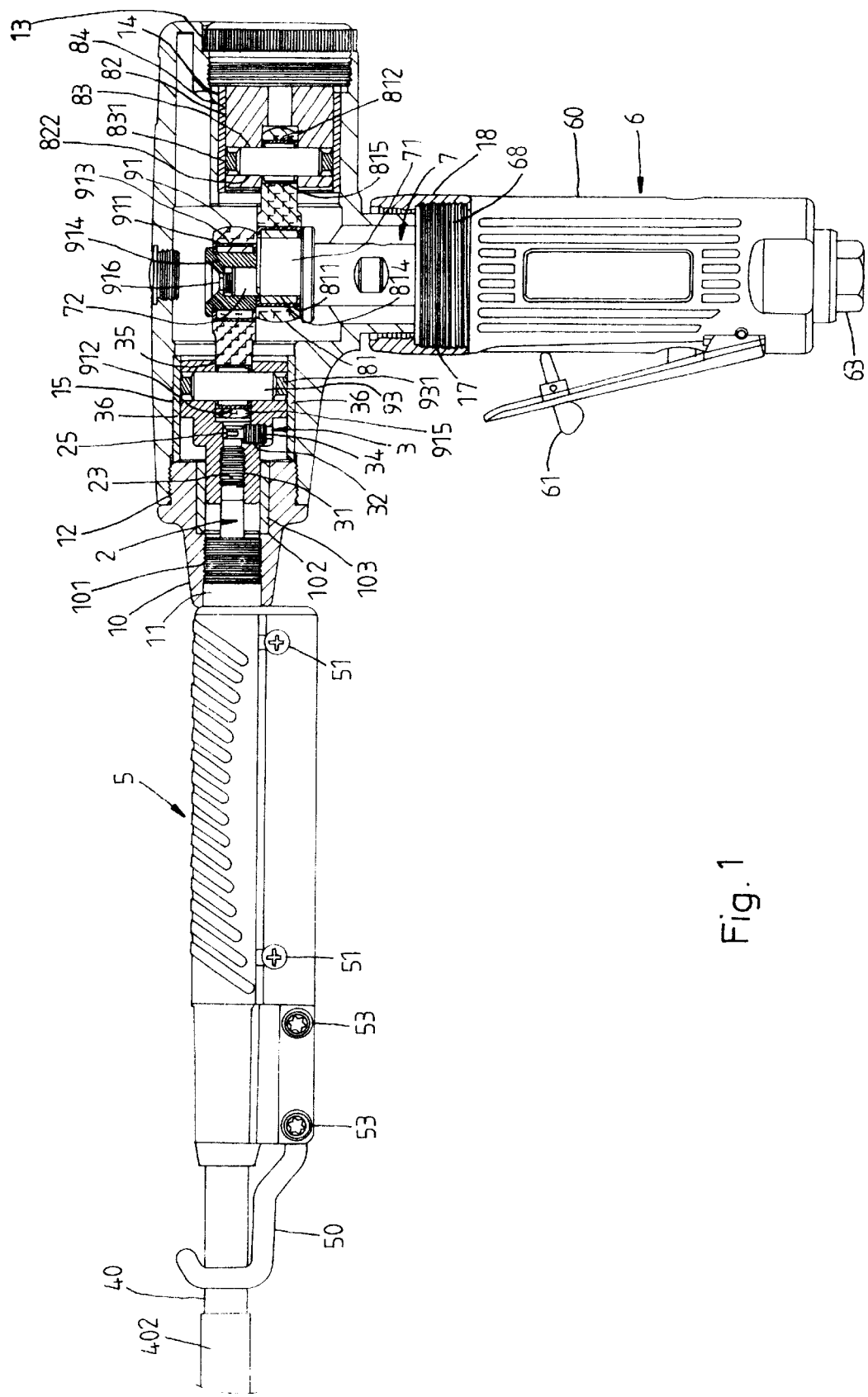
FIG. 1 is a sectional assembly view of, a pneumatic power cutting tool according to the present invention.
Figure 2:
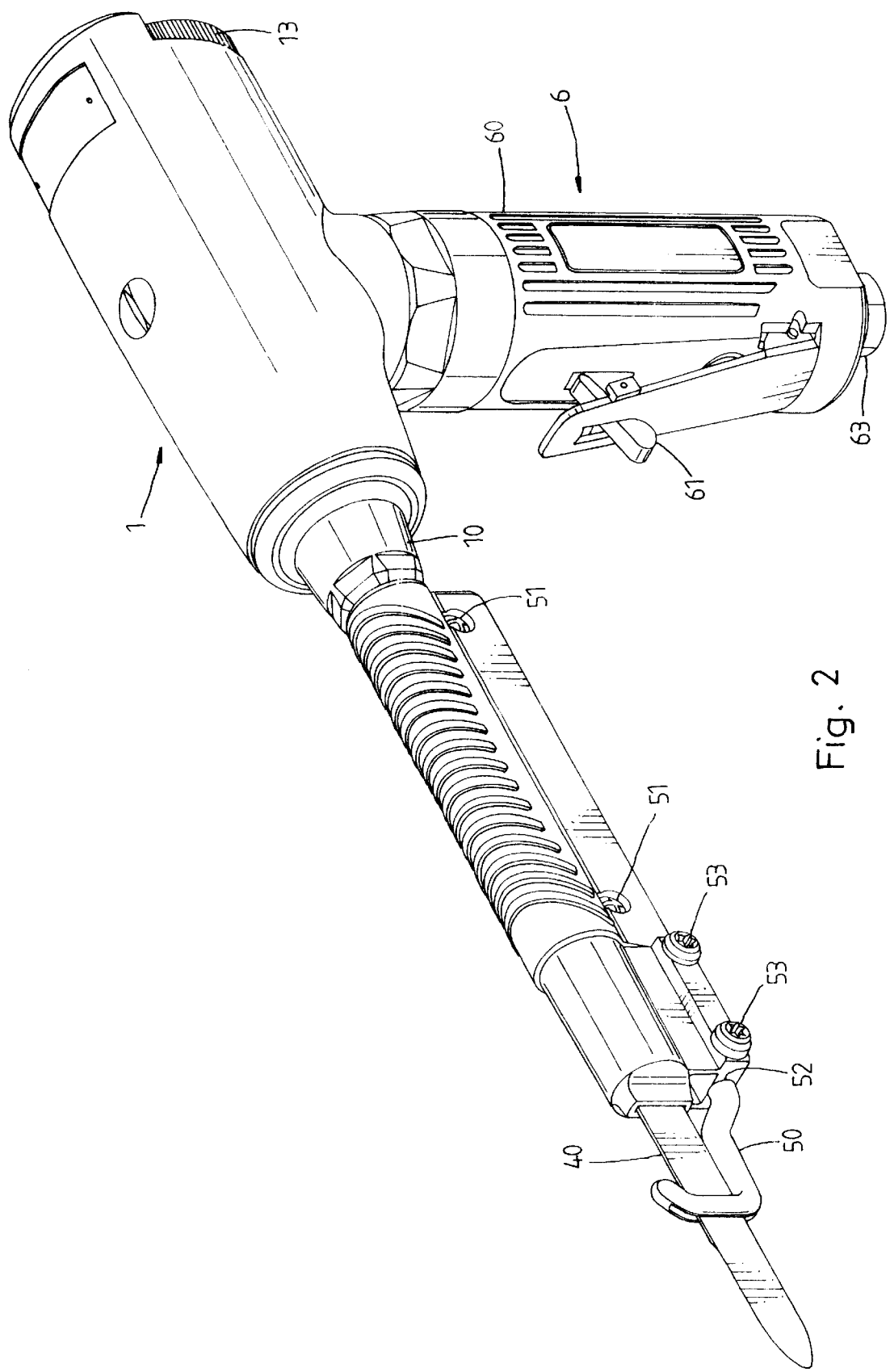
FIG. 2 is an elevational view of the pneumatic power cutting tool according to the present invention.

Referring to FIGS. from 1 through 7, a pneumatic power cutting tool is shown comprised of a housing 1, a locating block 10, a sleeve 11, a link 2, a link connector 3, a cutter holder 4, a front shell 5, a handle 6, an eccentric transmission shaft 7, and a motor drive 62.

The housing 1 comprises an inner thread 12 in the front side thereof for fastening to the locating block 10, an outer thread 17 at the bottom side thereof, a coupling ring 18 threaded onto the outer thread 17 of the housing 1 and an outer thread 68 of the handle 6 to secure the handle 6 to the housing 1, and a rear end cap 13 fastened to the rear side thereof.

The locating block 10 comprises an outer thread 101 threaded into the inner thread 12 of the housing 1, and an axial hole 102 disposed in the rear side and adapted to hold a bushing 103 and the link connector 3 in the bushing 103.

The sleeve 11 has a front outer thread 111 disposed at the end thereof and threaded into one end of the locating block 10 in communication with the axial hole 102, and a rear end mounted with a hollow screw 22, which has a threaded shank 221 threaded into the rear end of the sleeve 1.

The link 2 is inserted through the sleeve 11, having a first outer thread 21 disposed at one end, namely, the front end and connected to the cutter holder 4 and a second outer thread 23 disposed at the other end, namely, the rear end.

The link connector 3 comprises a front inner thread 31 threaded onto the second outer thread 23 of the link 2, a bottom screw hole 32, a tightening up screw 34 threaded into the bottom screw hole 32 and engaged into a rear positioning recess 25 in the bottom side of the rear end of the link 2.

Figure 3:
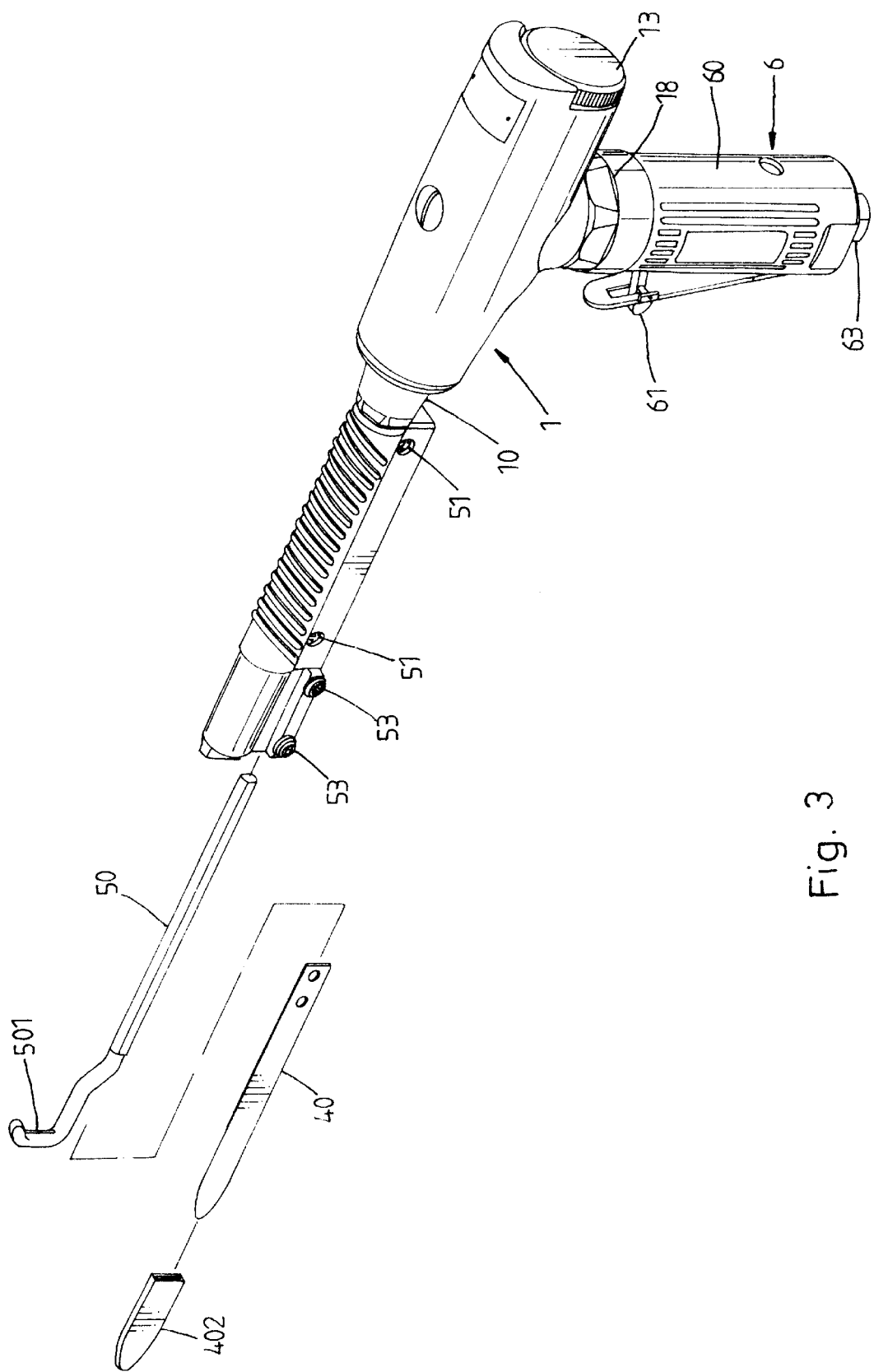
FIG. 3 is an exploded view of the present invention showing the cutter blade and the rack disconnected from the pneumatic power cutting tool.
Figure 7:
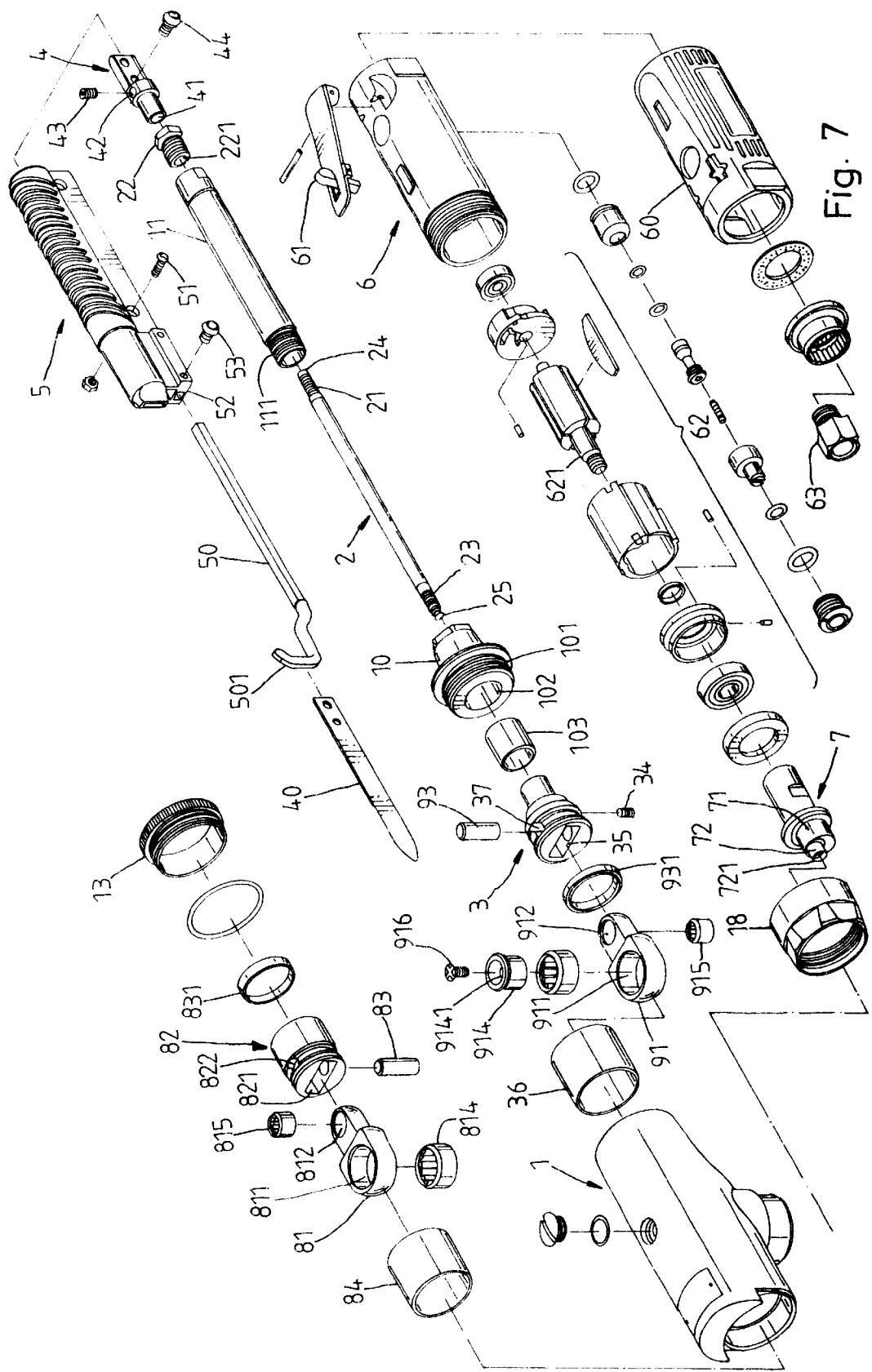
FIG. 7 is an exploded view of the pneumatic power cutting tool according to the present invention.

The cutter holder 4 comprises a rear inner thread 41 threaded onto the first outer thread 21 of the link 2, a top screw hole 42, a tightening up screw 43 threaded into the top screw hole 42 and engaged into a front positioning recess 24 of the link 2 (see FIG. 7), and a cutter blade 40 fixedly secured to the front side thereof by a lock screw 44. Further, a sheath 402 is provided for protecting the cutter blade 40 (see FIG. 3).

The front shell 5 is sleeved onto the sleeve 11 and fixedly secured thereto by fastening devices 51, having a longitudinal locating groove 52 disposed at one lateral side and extended to the front end, for the positioning of a rack 50. The rack 5 has a rear end fixedly fastened to the locating groove 52 of the front shell 5 by fastening devices 53, and a front opening 501, which receives the cutter holder 4.

The handle 6 is a hollow member sleeved with a tubular grip 60, having an outer thread 68 threaded into the coupling, ring 18, an on/off switch 61 for operation control, and a bottom connector 63 for the connection of the output tube of an air compressor (not shown).

The eccentric transmission shaft 7 has an inner thread 70 disposed in one end thereof and connected to the output shaft 621 of the motor drive 62 for synchronous rotation with the output shaft 621 of the motor drive 62.

The motor drive 62 is rotatable by compressed air. When the output shaft 621 of the motor drive 62 rotated, the eccentric transmission shaft 7 is driven to reciprocate the link 2, thereby causing the cutter blade 40 of the cutter holder 4 to be moved back and forth with the link 2 to cut the windshield packing frame.

Figure 4:
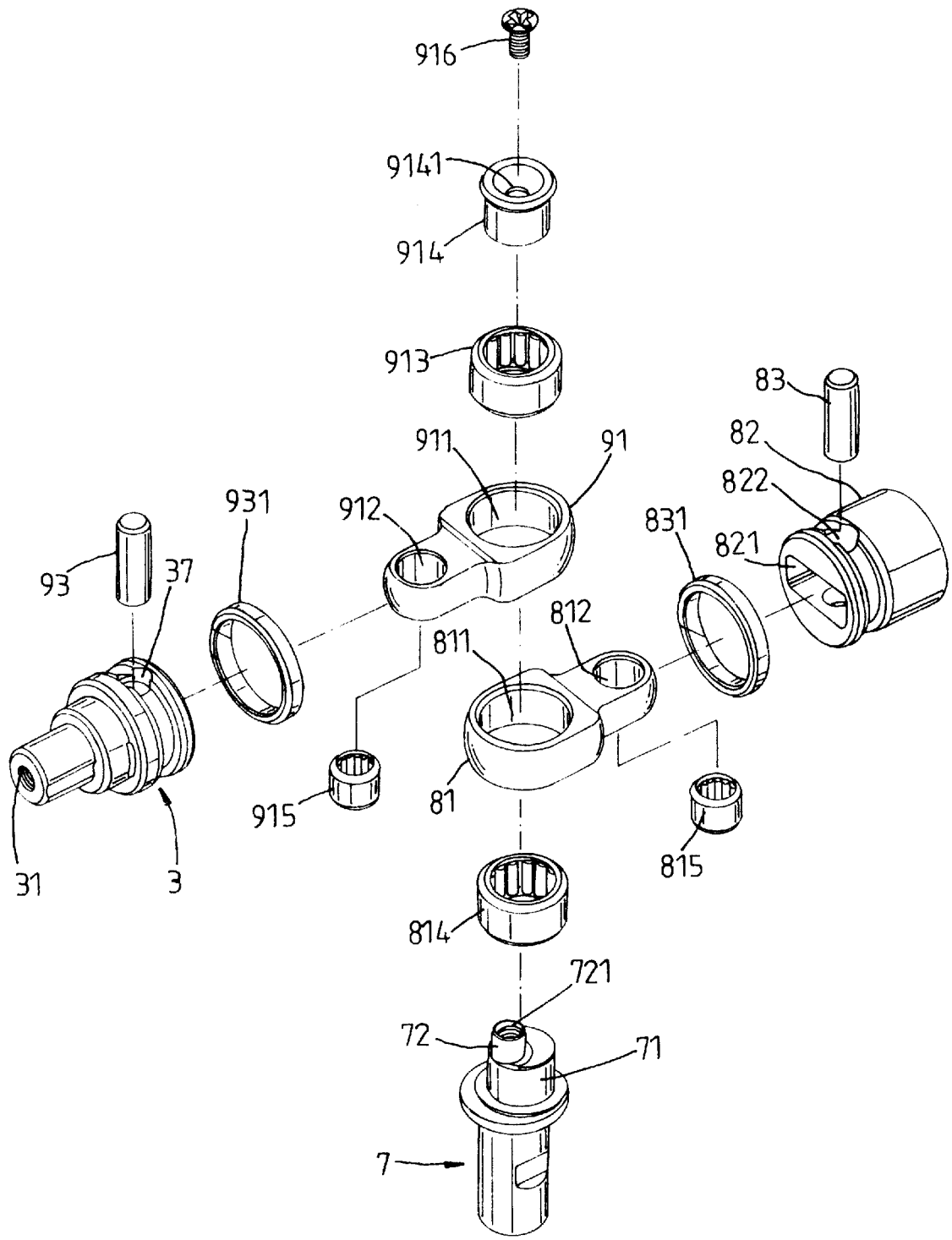
FIG. 4 is an exploded view of a part of the present invention.
Figure 5:
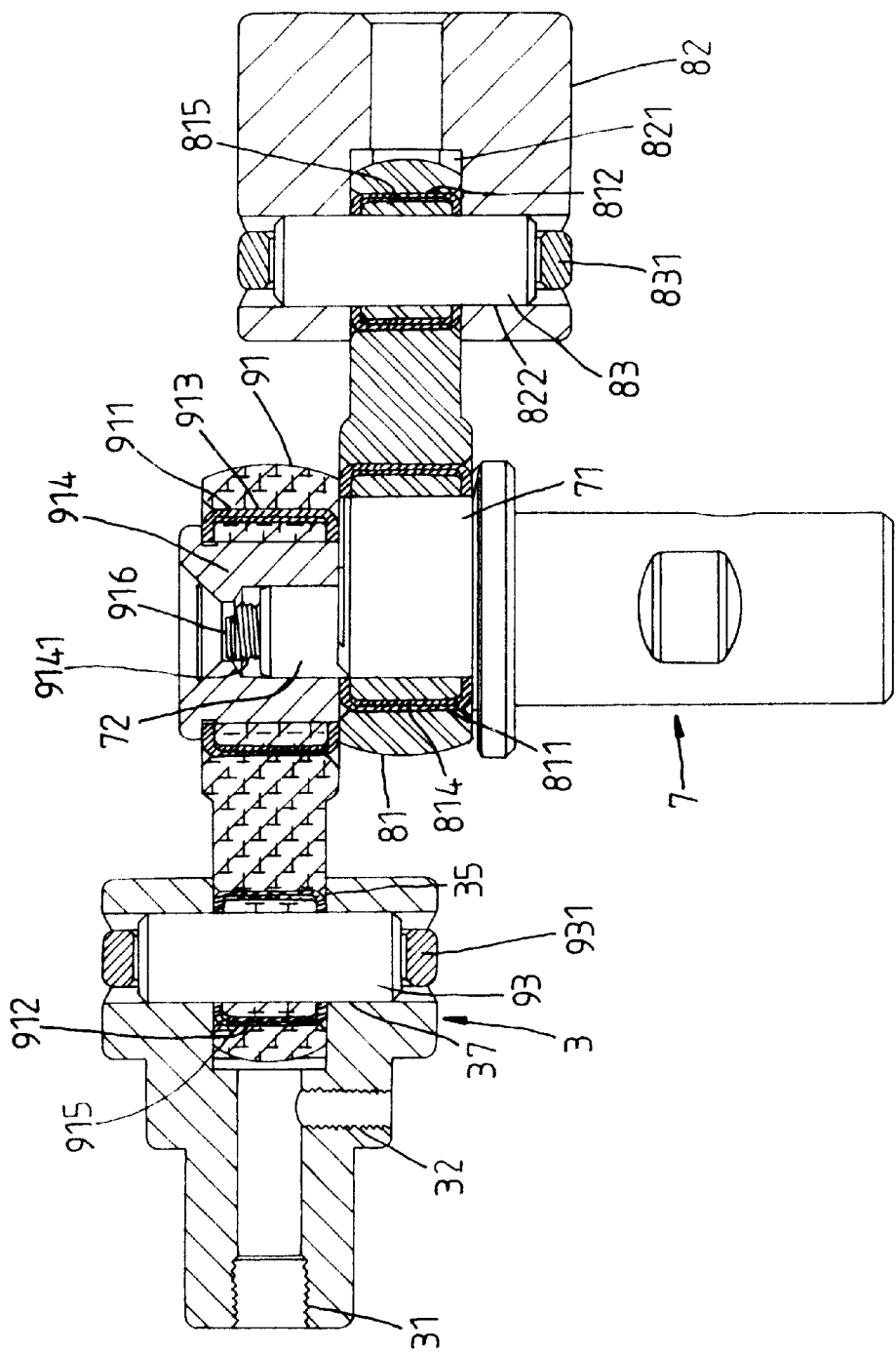
FIG. 5 is a sectional view of a part of the present invention showing the arrangement of the first coupling block and the second coupling block in the pneumatic power cutting tool.
Figure 6:
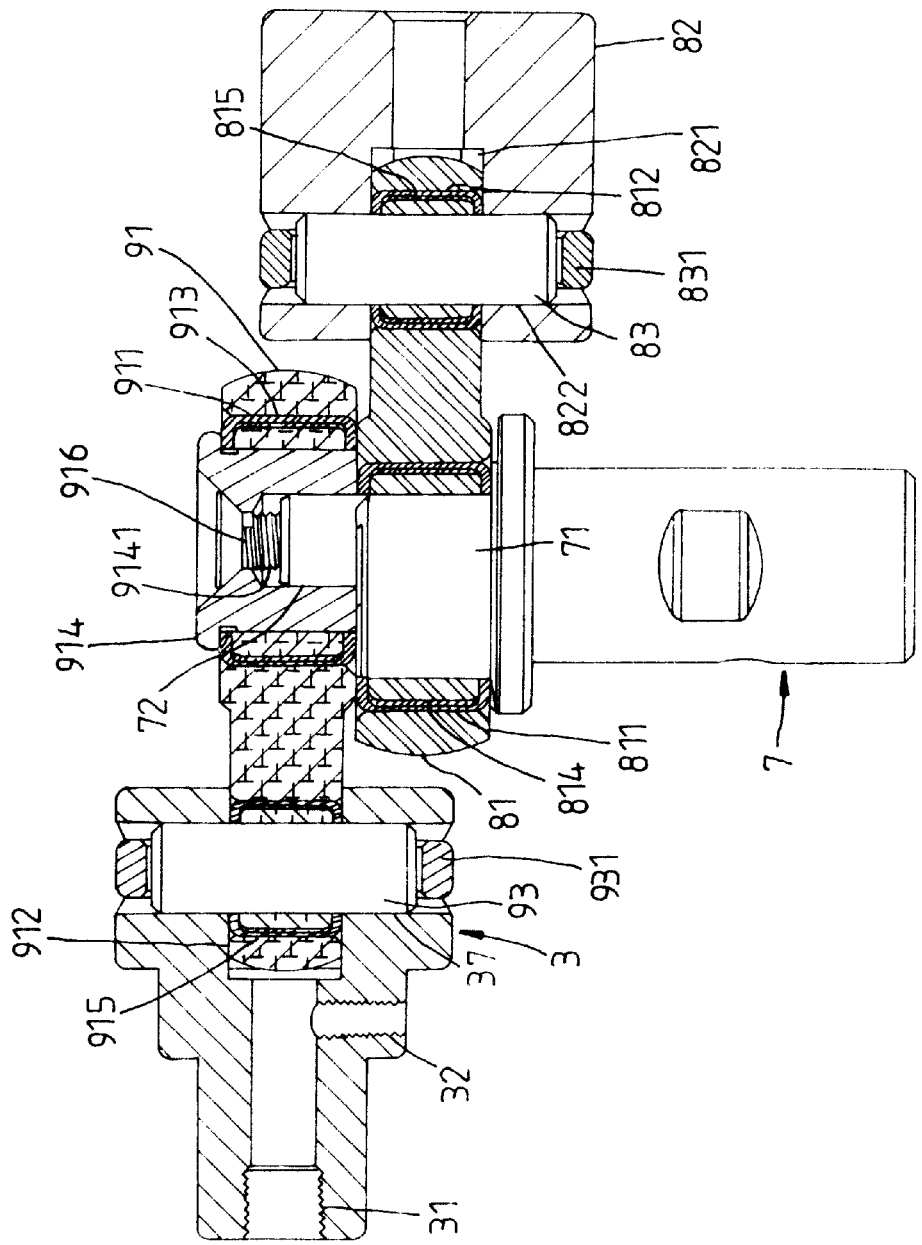
FIG. 6 is similar to FIG. 5 but showing the sliding block and the link connector moved in reversed directions.

The main features of the present invention are outlined hereinafter with reference to FIGS. 4~6. The eccentric transmission shaft 7 comprises a first eccentric shaft 71 pivotally coupled to a first coupling block 81, and a second eccentric shaft 72 forwardly eccentrically extended from the front end of the first eccentric shaft 71 and pivotally coupled to a second coupling block 91. The first coupling block 81 comprises a first coupling hole 811 coupled to the first eccentric shaft 71 of the eccentric transmission shaft 7, and a second coupling hole 812 coupled to a sliding block 82. The sliding block 82 comprises a locating slot 821 longitudinally disposed in one end thereof, which receives one end of the first coupling block 81, a transverse pin hole 822 extended across the locating slot 821, a locating pin 83 mounted in the pin hole 822 and inserted through the second coupling hole 812 of the first coupling block 81, a packing ring 831 mounted on the periphery to hold down the locating pin 83 in the transverse pin hole 822, and a friction sleeve 84 fastened to the periphery thereof for sliding in a longitudinal sliding way 14 in the rear side of the housing 1. The second coupling block 91 comprises a first coupling hole 911 coupled to the second eccentric shaft 72 of the eccentric transmission shaft 7, and a second coupling hole 912 coupled to the rear end of the link connector 3. The link connector 3 comprises a locating slot 35 axially disposed in the rear end thereof, which receives one end of the second coupling block 91, a transverse pin hole 37 extended across the locating slot 35, a locating pin 93 fastened to the transverse pin hole 37 and inserted through the second coupling hole 912 of the second coupling block 91 to secure the second coupling block 91 to the link connector 3, and a packing ring 931 mounted on the periphery to hold down the locating pin 93 in the transverse pin hole 37. Further, the link connector 3 is sleeved with a friction sleeve 36 for smooth reciprocation in a sliding way 15 in the front side of the housing 1.

During rotary motion of the eccentric transmission shaft 7, the second coupling block 91 is driven by the second eccentric shaft 72 to move the link connector 3 alternatively back and forth in a sliding way 15 in the front side of the housing 1 (see FIGS. 5 and 6), thereby causing the cutter blade 40 to be reciprocated with the link 2 and the link connector 3 to cut the windshield packing frame. At the same time, the sliding block 82 is reciprocated with the first coupling block 81 in the sliding way 14 of the housing 1 in reverse to the link connector 3 (see FIGS. 5 and 6) to balance the centrifugal force due to the reciprocating motion of the cutter blade 40 with the second eccentric shaft 72, reducing the production of vibration and noise. Because less vibration is produced during the operation of the pneumatic power cutting tool, the user can conveniently operate the pneumatic power cutting tool for a long time period without hurting the hands. The advantage of low vibration of the present invention greatly prolongs the service life of the motor drive 62.

Further, the first coupling hole 811 of the first coupling block 81 is mounted with a first bearing 814 and then coupled to the first eccentric shaft 71 of the eccentric transmission shaft 7; the second coupling hole 812 is mounted with a bearing 815 and then secured to the sliding block 82 by the locating pin 83; the first coupling hole 911 is mounted with a bearing 913 and a bushing 914 in the bearing 913 and then coupled to the second eccentric shaft 72 of the eccentric transmission shaft 7; the second eccentric shaft 72 has an axial screw hole 721 connected to a screw hole 9141 in the bushing 914 by a screw 916; the second coupling hole 912 of the second coupling block 91 is mounted with a bearing 915 and then fastened to the link connector 3 by the locating pin 93.

A prototype of pneumatic power cutting tool has been constructed with the features of FIGS. 1~7. The pneumatic power cutting tool functions smoothly to provide all of the features discussed earlier.

Although a particular embodiment of the invention has been described in detail for purposes of illustration, various modifications and enhancements may be made without departing from the spirit and scope of the invention. Accordingly, the invention is not to, be limited except as by the appended claims.

What is claimed is:

1. A pneumatic power cutting tool comprising a housing, said housing comprising an inner thread in a front side thereof, an outer thread at a bottom side thereof, a coupling ring threaded onto the outer thread of said housing, and a rear end cap fastened to a rear side thereof;

a locating block, said locating block comprising an outer thread threaded into the inner thread of said housing, an axial hole disposed in a rear side, and a bushing mounted in said axial hole;

a sleeve, said sleeve having a front outer;thread disposed at an end thereof and threaded into one end of said locating block, and a rear end mounted with a hollow screw;

a link inserted through said sleeve, said link having a first outer thread disposed at a front end thereof and a second outer thread disposed at a rear end thereof, a front positioning recess, and a rear positioning recess;

a link connector inserted into the bushing in the axial hole of said locating block, said link connector comprising a front inner thread threaded onto the second outer thread of said link, a bottom screw hole, a tightening up screw threaded into said bottom screw hole and engaged into the rear positioning recess of said link;

a cutter holder, said cutter holder comprising a rear inner thread threaded onto the first outer thread of said link, a top screw hole, a tightening up screw threaded into said top screw hole and engaged into the front positioning recess of said link, and a cutter blade fixedly secured to a front side thereof by a lock screw;

a front shell sleeved onto said sleeve and fixedly secured thereto by fastening devices, said front shell having a longitudinal locating groove disposed at one lateral side thereof and extended to a front end thereof;

a rack adapted for supporting said cutter holder, said rack having a rear end fixedly fastened to the locating groove of said front shell by fastening devices, and a front opening, which receives said cutter holder;

a handle sleeved with a tubular grip and fastened to the coupling ring of said housing, said handle comprising an on/off switch for operation control, and a bottom connector for connection to an air compressor to receive compressed air;

an eccentric transmission shaft, said eccentric transmission shaft having an inner thread disposed in one end thereof;

a motor drive adapted for receiving compressed air from the bottom connector of said handle and rotating said eccentric transmission shaft bottom connector when receiving compressed air from the bottom connector of said handle, said motor drive comprising an output shaft fastened to the inner thread of said eccentric transmission shaft and adapted for rotating said eccentric transmission shaft to reciprocate said link and said cutter blade of said cutter holder for cutting things;

wherein:

said eccentric transmission shaft comprises a first eccentric shaft pivotally coupled to a first coupling block, and a second eccentric shaft forwardly eccentrically extended from a front end of said first eccentric shaft and pivotally coupled to a second coupling block;

said housing comprising a first sliding way longitudinally disposed in the rear side thereof, a second sliding way longitudinally disposed in the front side thereof, said first coupling block comprising a first coupling hole coupled to the first eccentric shaft of said eccentric transmission shaft, a second coupling hole, a sliding block coupled to the second coupling hole of said first coupling block and adapted for sliding in said first sliding way, said sliding block comprising a locating slot longitudinally disposed in one end thereof, which receives one end of said first coupling block, a transverse pin hole extended across the locating slot of said sliding block, a locating pin mounted in the pin hole of said sliding block and inserted through the second coupling hole of said first coupling block, a packing ring mounted on the periphery thereof to hold down the locating pin of said sliding block in the transverse pin hole of said sliding block, and a friction sleeve fastened to the periphery thereof for sliding with said sliding block in said first sliding way of said housing, and said second coupling block comprising a first coupling hole coupled to the second eccentric shaft of said eccentric transmission shaft, and a second coupling hole coupled to said link connector;

said link connector is sleeved with a friction axle sleeve for reciprocation in the second sliding way of said housing, comprises a locating slot axially disposed in a rear end thereof, which receives one end of said second coupling block, a transverse pin hole extended across the locating slot of said link connector, a locating pin fastened to the transverse pin hole of said link connector and inserted through the second coupling hole of said second coupling block to secure said second coupling block to said link connector, and a packing ring mounted on the periphery thereof to hold down the locating pin of said link connector in the transverse pin hole of said link connector;

said second coupling block is driven by the second eccentric shaft of said eccentric transmission shaft to reciprocate said link connector in said second sliding way of said housing, thereby causing said cutter blade to be reciprocated with said, link and said link connector upon operation of said motor drive, and at the same time, said sliding block is reciprocated with said first coupling block in said first sliding way of said housing in reverse to said link connector to balance the centrifugal force due to the reciprocating motion of said cutter blade with said second eccentric shaft, reducing the production of vibration and noise.

2. The pneumatic power cutting tool as claimed in claim 1, wherein the first coupling hole of said first coupling block is mounted with a bearing and then coupled to the first eccentric shaft of said eccentric transmission shaft; the second coupling hole of said first coupling block is mounted with a bearing and then secured to said sliding block by a locating pin; the first coupling hole of said second coupling block is mounted with a bearing and a bushing in the bearing and then coupled to the second eccentric shaft of said eccentric transmission shaft; the second eccentric shaft of said eccentric transmission shaft has an axial screw hole connected to a screw hole in the bushing in the bearing inside the first coupling hole of said second coupling block by a screw; the second coupling hole of said second coupling block is mounted with a bearing and then fastened to said link connector by the locating pin.

\* \* \* \* \*